US010411890B2

(12) United States Patent
Arahira

(10) Patent No.: US 10,411,890 B2
(45) Date of Patent: Sep. 10, 2019

(54) AUTHENTICATION SYSTEM, AUTHENTICATION SIDE DEVICE, AND SECURITY SYSTEM

(71) Applicant: Oki Electric Industry Co., Ltd., Tokyo (JP)

(72) Inventor: Shin Arahira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 158 days.

(21) Appl. No.: 15/640,664

(22) Filed: Jul. 3, 2017

(65) Prior Publication Data

US 2018/0062842 A1 Mar. 1, 2018

(30) Foreign Application Priority Data

Aug. 31, 2016 (JP) ................................. 2016-170269

(51) Int. Cl.
*H04L 9/32* (2006.01)
*H04L 9/30* (2006.01)
*H04B 10/54* (2013.01)
*H04L 29/06* (2006.01)
*H04L 9/08* (2006.01)
*H04B 10/70* (2013.01)
*H04L 29/12* (2006.01)

(52) U.S. Cl.
CPC ............... *H04L 9/30* (2013.01); *H04B 10/54* (2013.01); *H04B 10/70* (2013.01); *H04L 9/0852* (2013.01); *H04L 9/0872* (2013.01); *H04L 9/3297* (2013.01); *H04L 63/0428* (2013.01); *H04L 61/6022* (2013.01)

(58) Field of Classification Search
CPC ....... H04L 9/30; H04L 9/0852; H04L 9/3297; H04L 9/0872; H04L 63/0428; H04L 61/6022; H04B 10/70; H04B 10/54
USPC ....................................................... 713/168
See application file for complete search history.

(56) References Cited

FOREIGN PATENT DOCUMENTS

JP 2000-201144 A 7/2000

*Primary Examiner* — Mohammad W Reza
(74) *Attorney, Agent, or Firm* — Rabin & Berdo, P.C.

(57) ABSTRACT

The authentication system comprises: the authentication side unit configured to include the intensity modulated weak light source, the first reading unit, the decrypting unit, and the determining unit; and the client side unit configured to include the detecting unit, the second reading unit, and the encrypting unit. The intensity modulated weak light source generates intensity modulated weak light. The first reading unit reads the transmission time information. The detecting unit detects the intensity modulated weak light, and records the detected time in the second storage medium as reception time information. The encrypting unit encrypts all or part of the reception time information and generates encrypted information. The decrypting unit decrypts the encrypted information, and acquires all or part of the reception time information. The determining unit acquires a number of coincidence events and a number of elements of the all or part of the reception time information, generates determination information including information indicating approval when both of the number of coincidence events and the number of elements are within a range of a set value which is set in advance, and generates determination information including information indicating a denial in the other cases.

14 Claims, 8 Drawing Sheets

AUTHENTICATION SYSTEM, AUTHENTICATION SIDE DEVICE, AND SECURITY SYSTEM

CROSS REFERENCE TO RELATED APPLICATION(S)

This application is based upon and claims benefit of priority from Japanese Patent Application No. 2016-170269, filed on Aug. 31, 2016, the entire contents of which are incorporated herein by reference.

BACKGROUND

The present invention relates to an authentication system, an authentication side device, and a security system.

Authentication systems or cryptographic communication systems are commonly used when there is a desire to conceal the content of services being provided and enjoyed with a specific partner.

In an authentication system, for example, both a side that provides services (referred to as "authentication server" here) and a side that receives services (referred to as "client" here) share confidential information unknown to a third party and identify and authenticate a counterpart by collating it. For example, an authentication system using a secret password, an individual identification recognition (identification (ID)) number, a fingerprint, a face, or the like, media access control (MAC) authentication using a MAC address which is an individual identification number of a device, and the like are often used.

In the cryptographic communication system, encryption and decryption of information (plain text) which is transmitted and received are performed using a public key system using a public key or a common key system using a common key.

The authentication systems and the cryptographic communication systems are used in various fields such as electronic payment systems using cash cards, credit cards, and the like and security gate systems that manage entrance and exit of office buildings, security rooms, and the like. In these systems, it is necessary to identify authorized users and unauthorized persons quickly and reliably. As an authentication system satisfying such requirements, for example, systems that identify and authenticate users using an ID number, fingerprint authentication, or face authentication are widely used.

On the other hand, attacks by unauthorized persons, for example, by copying or forging ID cards are well known. As one countermeasure to this, there is a method of combining and using a secret password known only to the user and the system administrator in the above authentication system, like that used in an automatic teller machines (ATM) at a bank or the like.

A problem of the method using this password lies in generation and management of the password. In other words, a problem is how the administrator of the authentication system and the authorized user share the password while preventing the password from being known to an unauthorized person.

For example, when a fixed password is used in a plurality of authentication systems, an unauthorized person can easily infer the password. An effective method of solving this is to change the secret password frequently. However, each time the password is changed, it is necessary to memorize a new password, which is a large burden on an authorized user.

Further, when a password is frequently received via a communication line which is generally used, an unauthorized person is likely to steal the password by wiretapping the communication line. In this case, information passing through the communication line is a classical information amount. For this reason, it is possible to copy and use the password, and the possibility of unauthorized use further increases.

In recent years, a password generation method using a terminal such as a security token has emerged. However, this password generation method is based on a mathematical algorithm. For this reason, when the algorithm is known, it is possible to infer the password.

Further, it is known that in cryptographic communication using quantum mechanical properties for generation and distribution of passwords, it is possible to implement communication of the utmost confidentiality, and an authentication system using this cryptographic communication has been proposed (for example, JP 2000-201144A).

SUMMARY

However, since it is difficult to share a secret key even for the cryptographic communication, it is hardly used.

In other words, it is desirable to provide an authentication system and an authentication side device which are capable of securely and easily sharing a secret key only between an authentication side device and a client side device of the authentication system and a security system using the authentication system.

According to an embodiment of the present invention, the authentication system includes: the authentication side unit including the intensity modulated weak light source, the first storage medium, the first reading unit, the decrypting unit, and the determining unit; and the client side unit including the detecting unit, the second storage medium, the second reading unit, and the encrypting unit.

The intensity modulated weak light source generates the intensity modulated weak light in which a mean number of photons of a mark state is 1 or less, and a temporal position of the mark state is randomly modulated. The first storage medium records a time at which the intensity modulated weak light source is set to the mark state as transmission time information. The first reading unit reads the transmission time information from the first storage medium. The detecting unit detects the intensity modulated weak light via a quantum channel, and records the detected time in the second storage medium as reception time information. The second reading unit reads the reception time information from the second storage medium. The encrypting unit encrypts all or part of the reception time information using a pre-shared key and generates encrypted information. The decrypting unit decrypts the encrypted information using the pre-shared key, and acquires all or part of the reception time information. The determining unit acquires the number of coincidence events using the transmission time information read from the first reading unit and the all or part of the reception time information read from the decrypting unit, acquires the number of elements of the all or part of the reception time information, generates determination information including information indicating approval when both of the number of coincidence events and the number of elements are within a range of a set value which is set in advance, and generates determination information including information indicating a denial in the other cases.

Further, the authentication side device according to an embodiment of the present invention includes the authentication side unit.

Further, the security system according to an embodiment of the present invention includes the management device and the security gate. The management device includes the authentication side unit, and the security gate includes the entrance/exit gate and the client side unit. Here, the authentication side unit and the client side unit constitute the authentication system, and the entrance/exit gate is opened when the determination information includes information indicating approval.

According to the authentication system, the authentication side device, and the security system according to an embodiment of the present invention, it is possible to detect the presence of an unauthorized user and authenticate only an authorized user using intensity modulated weak light.

DETAILED DESCRIPTION OF THE EMBODIMENT(S)

Figure 1:
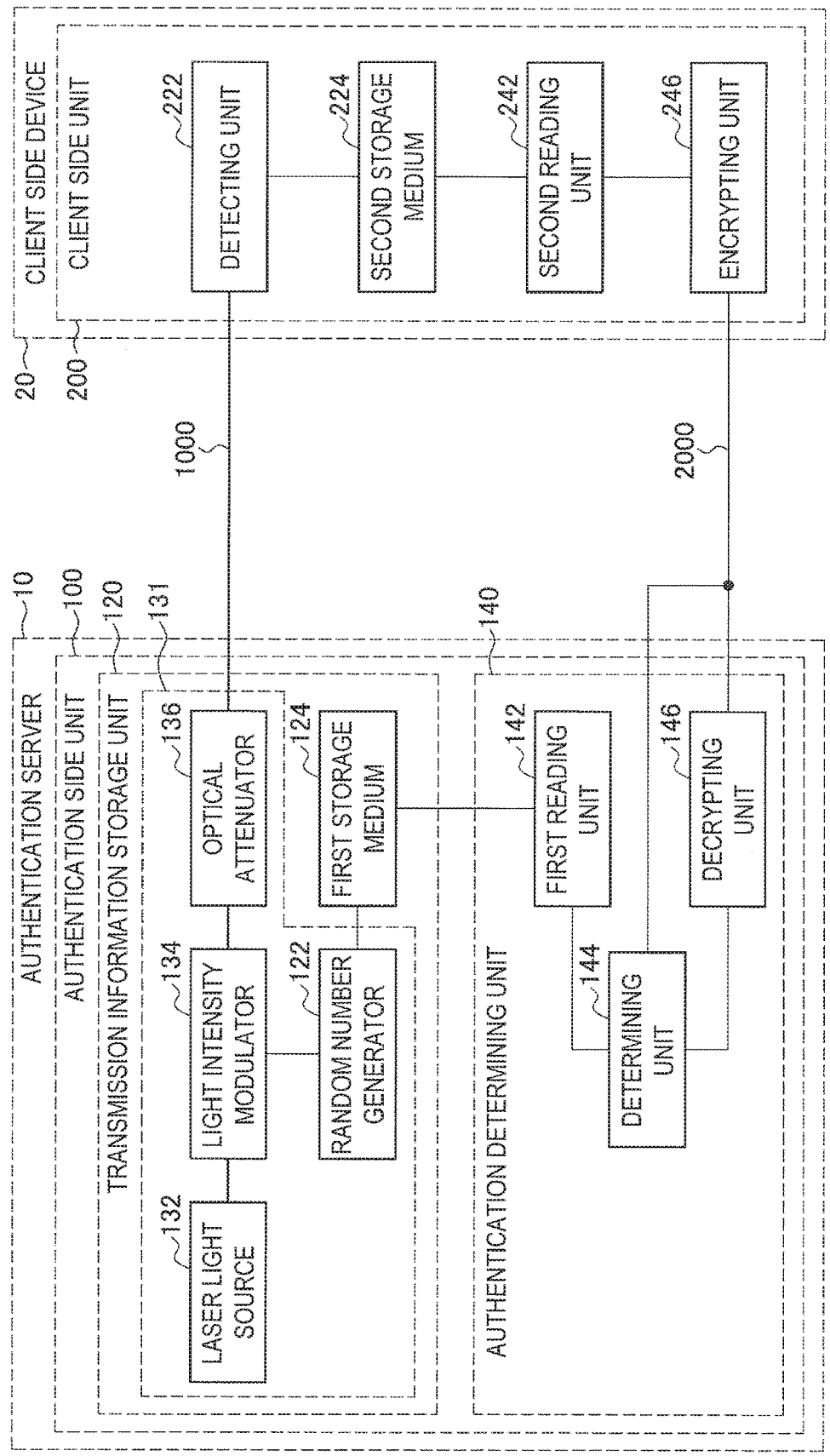
FIG. 1 is a schematic diagram of a first authentication system.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(First Authentication System)

Figure 2:
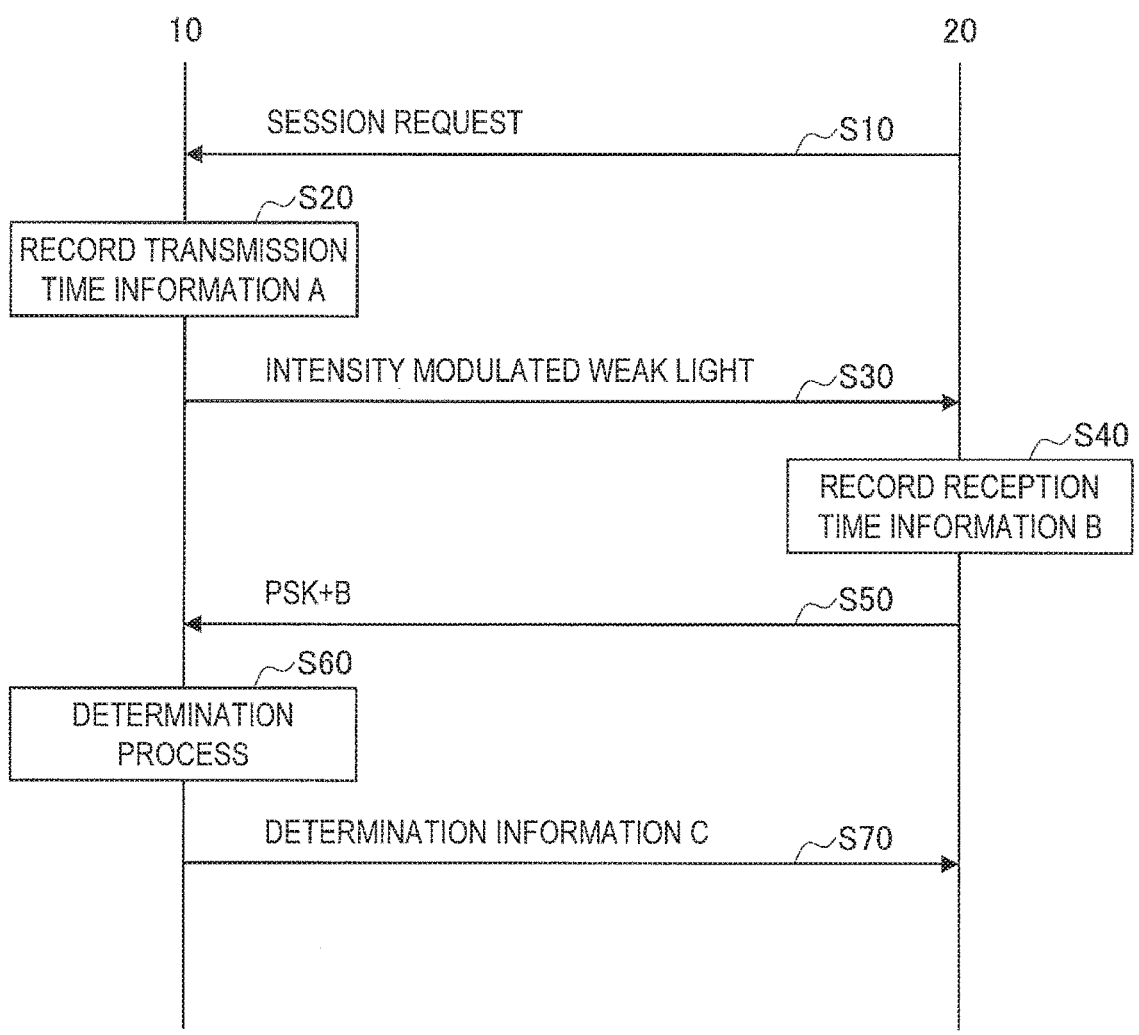
FIG. 2 is a schematic diagram illustrating an operation of the first authentication system.

A configuration and operation of an authentication system according to a first embodiment (hereinafter referred to as "first authentication system") will be described with reference to FIGS. 1 and 2. FIG. 1 is a schematic diagram of the first authentication system. FIG. 2 is a schematic diagram illustrating an authentication method in the first authentication system.

The first authentication system includes an authentication server (authentication side device) 10 and an authenticated terminal (client side device) 20 which undergoes authentication by the authentication server 10. The authentication server 10 and the client side device 20 have confidential information used to authenticate the other party in advance. Here, the confidential information is referred to as "pre-shared key (PSK)."

The authentication server 10 includes an authentication side unit 100. The authentication side unit 100 includes a transmission information storage unit 120 and an authentication determining unit 140.

The transmission information storage unit 120 includes an intensity modulated weak light source 131 and a first storage medium 124. The authentication determining unit 140 includes a first reading unit 142, a determining unit 144, and a decrypting unit 146.

The client side device 20 has a client side unit 200. The client side unit 200 includes a detecting unit 222, a second storage medium 224, a second reading unit 242, and an encrypting unit 246.

Here, a system clock of the authentication server 10 and the client side device 20 is assumed to be 1 GHz, and a time slot width is assumed to be 1 ns.

The intensity modulated weak light source 131 includes, for example, a random number generator 122, a laser light source 132, a light intensity modulator 134, and an optical attenuator 136. The intensity modulated weak light source 131 generates an intensity modulated weak light in which a mean number of photons of a mark state is 1 or less, and a temporal position of the mark state is modulated randomly.

The random number generator 122 randomly generates a bit "0" and a bit "1" as a random number. The random number generator 122 sequentially allocates the generated random number to time slots, and records a time that has a start time of a time 0 and corresponds to the bit "1" in the first storage medium 124 as transmission time information A {ta1, ta2, ta3, . . . }. For example, when the random number generated by the random number generator 122 is "1011001", ta1=0 ns, ta2=2 ns, ta3=3 ns, and ta4=6 ns.

The random number generated by the random number generator 122 is transferred to the light intensity modulator 134 as an electrical signal.

Output light from the laser light source 132 is transferred to the light intensity modulator 134. The light intensity modulator 134 generates intensity modulated light by performing intensity modulation on the output light from the laser light source 132 on the basis of the random number which is generated by the random number generator 122 and allocated to each time slot. In a time slot in which the random number is the bit "1," the light intensity modulator 134 is set to a mark state in which photons are included in the intensity modulated light. Further, in a time slot in which the random number is the bit "0," the light intensity modulator 134 is set to a space state in which no photons are included in the intensity modulated light.

Here, a ratio of bits "1" to all bits of the random number output from the random number generator 122 is defined as a mark ratio M. For example, when the ratios of bits "1" and "0" are half and half, M=0.5, and when there is one bit "1" among 100 bits, M=0.01.

The optical attenuator 136 generates the intensity modulated weak light by attenuating the intensity modulated light so that a mean number of photons ($\mu$) included in the bit "1," that is, at the time of the mark state becomes a value sufficiently smaller than 1. In the intensity modulated weak light, a possibility of two or more photons being included in one time slot is sufficiently low, and the mean number of photons in the space state is substantially 0.

Here, the intensity modulated weak light source 131 has been described as including the random number generator 122, the laser light source 132, the light intensity modulator 134, and the optical attenuator 136, but the present invention is not limited thereto. For example, instead of using the light intensity modulator 134, the intensity modulated light may be generated through a direct modulation technique of modulating a drive current of the laser light source 132 using an output of the random number generator 122.

When there is an authentication session request from the client side device 20 (S10), the authentication server 10 transmits the intensity modulated weak light to the client side device 20 via a quantum channel 1000 configured with an optical fiber, a spatial optical system, or the like (S30). Further, transmission time information A is recorded in the first storage medium 124 (S20).

For example, the detecting unit 222 of the client side device 20 is configured with a single photon detector, and receives the intensity modulated weak light transferred from the authentication server 10. The detecting unit 222 records occurrence times of all detection events in the detecting unit 222 which occur within the same unit time as those recorded in the first storage medium 124 in the second storage medium 224 as reception time information B {tb1, tb2, tb3, . . . } (S40). For example, when a start time is a time 0, and the detection events occur at times 0 ns, 1 ns, 3 ns, and 5 ns, tb1=0 ns, tb2=1 ns, tb3=3 ns, and tb4=5 ns.

The second reading unit 242 reads the reception time information B from the second storage medium 224 and transfers the reception time information B to the encrypting unit 246. The encrypting unit 246 encrypts the reception time information B using the PSK to generate encrypted information PSK+B. The encrypted information PSK+B is transferred to the authentication server 10 via a classical channel 2000 (S50).

The decrypting unit 146 of the authentication server 10 decrypts the encrypted information PSK+B using the PSK and obtains the reception time information B. Further, the first reading unit 142 of the authentication server 10 reads the transmission time information A from the first storage medium 124.

The transmission time information A obtained through the first reading unit 142 and the reception time information B obtained through the decrypting unit 146 are transferred to the determining unit 144.

The determining unit 144 collates transmission time information A and reception time information B and acquires the number of coincident elements (the number of coincidence events). Further, the number of elements of the reception time information B is acquired. Here, "coincident elements" indicates that there is a combination of x and y such that tax=tby (x and y are integers of 1 or larger). In an actual system, elements of the transmission time information A and elements of the reception time information B for the same event do not necessarily coincide with each other due to the length of the quantum channel 1000 or the like. In this case, the determining unit 144 may correct the influence of the length of the quantum channel 1000 and then determine whether or not the elements coincide with each other.

In the previous example, the transmission time information A is ta1=0 ns, ta2=2 ns, ta3=3 ns, and ta4=6 ns. The reception time information B is tb1=0 ns, tb2=1 ns, tb3=3 ns, and tb4=5 ns. In this case, the number of coincidence events is 2 because 0 ns and 3 ns coincide with each other. Further, the number of elements of the reception time information B is 4, that is, 0 ns, 1 ns, 3 ns, and 5 ns.

The determining unit 144 determines whether or not the number of coincidence events and the number of elements of the reception time information B are within a predetermined range which is set in advance and generates a result as determination information C. The determination information C includes information indicating approval when the number of coincidence events and the number of elements are within a predetermined range, and includes denial when at least one of the number of coincidence events and the number of elements is not within a predetermined range (S60).

The determining unit 144 transmits the determination information C to the client side device 20 (S70). When the determination information C includes the information indicating the denial, the client side device 20 makes a session request again and performs the authentication process again.

Here, a dark current count or the like of the detecting unit 222 can be ignored, and all the detection events in the detecting unit 222 may be photon detection.

Here, a loss in the quantum channel 1000 is assumed to be "$\alpha$", and the detection efficiency in the detecting unit 222 is assumed to be "$\eta$". Further, the number of samples (the number of time slots) is assumed to be n/M (n is an integer of 1 or larger), and the detection events at times corresponding to n/M time slots are considered. Since the mark rate is M, the number of elements of the transmission time information A is n (=(n/M)×M).

On the other hand, the number of detection events in the detecting unit 222, that is, an expectation value of the number of elements of the reception time information B, is indicated by the following Formula (1).

$$\mu\alpha\eta n \quad (1)$$

Since the detection events in the detecting unit 222 are considered to occur only in the photon detection, the detection event occurs only in the case of the mark state. Therefore, the expectation value of the number of coincidence events obtained by comparing the transmission time information A with the reception time information B is also indicated by Formula (1). In this case, a threshold value is set near the number of coincidence events indicated in Formula (1), and authentication is performed by determining whether or not the number of coincidence events exceeds the threshold value.

A method of designing the threshold value while considering possible attacks by an unauthorized person will be described.

An unauthorized person does not know 1 bit which is set to the mark state among 1/M bits by the authentication server 10. This assumption is valid when the random number generated by the random number generator 122 is a natural random number. Further, in this authentication system, it is not necessary for the authentication server 10 to inform a third party including an authorized client of a bit which is set to the mark state among 1/M bits. For this reason, it is extremely difficult for an unauthorized person to know a bit which is set to the mark state.

In this regard, the unauthorized person may appropriately decide the position of the mark state and create reception time information $B_E$ for acquiring identification authentication.

A probability that an unauthorized person can locate the position of the mark state in 1/M bits is M. Here, the number of times that an unauthorized person can attempt to locate the position of the mark state is a maximum of the number of elements of the reception time information B indicated in Formula (1). This is because the authentication server 10 can detect fraud when the reception time information B of the number of elements which is larger than one expected from a system design is transmitted to the client side device 20.

The expectation value of the number of coincidence events that can be obtained by the reception time information $B_E$ prepared by an unauthorized person is indicated by the following Formula (2).

$$\mu\alpha\eta n M \quad (2)$$

In other words, an unauthorized person can obtain the number of coincidence events of the mark ratio M for the authorized client side device 20.

Therefore, when a threshold value of the number of coincidence events is set between Formulas (1) and (2), the authentication server 10 can determine a client that has transmitted the reception time information B which is the number of coincidence events of the threshold value or less to be an unauthorized user.

A probability of the temporal position being found for a random signal of the mark ratio M is M. Then, when the attempt is repeated N times (N is the number of elements of the reception time information B indicated in Formula (1)), a probability Pr(k) of the temporal positions of k (k is an integer satisfying 1≤k≤N) mark states being able to be located is indicated by the following Formula (3).

$$Pr(k) = \binom{N}{k} M^k (1-M)^{N-k} \quad (3)$$

Therefore, a cumulative probability of k or more coincidence events being given is indicated by the following Formula (4).

$$\Sigma_{m=k}^{N} \binom{N}{m} M^m (1-M)^{N-m} \quad (4)$$

If M=0.1, N=100, an unauthorized person can obtain the number of coincidence events corresponding to an expectation value NM(=10) of binomial distribution. In this case, the cumulative probability that the number of coincidence events of 57 or more times is obtained with k=57 is calculated to be about $4.5 \times 10^{-31}$ using Formula (4). This means that it would take about 100 million years to find time information in which 57 or more simultaneous counts are obtained even through an exhaustive search using a supercomputer that performs an operation of $1 \times 10^{15}$ times per second.

For example, when a system administrator restricts the number of inputs that can be performed by an authorized user or an unauthorized person to a few times, the system administrator detects an unauthorized person before the unauthorized person finds appropriate time information.

In this case, the system administrator can determine that a user who has transmitted the time information $B_E$ with fewer than 57 coincidence events is an unauthorized user with a probability of $1-4.5 \times 10^{-31}$.

Further, the authentication server 10 need not let the client side device 20 know the transmission time information A. Therefore, it is possible to arbitrarily change the transmission time information A in each session. In this case, even when an unauthorized person repetitively makes the session request, since A and B change each time, it is difficult to infer A or B and increase the number of coincidence events.

On the other hand, a user who has transmitted the reception time information B with the more than 57 coincidence events can be substantially determined to be the user who has received the intensity modulated weak light generated by the authentication server 10 through a regular procedure. Thus, it is possible to approve or deny a user on the basis of whether or not the number of coincidence events exceeds the threshold value (k).

It is possible to decrease the cumulative probability of Formula (4) by decreasing M and increasing N and k. Therefore, the authentication server 10 can flexibly set M, N, and k in accordance with a security level requested by the system.

In the first authentication system, the authentication is performed on the basis of whether or not the number of coincidence events exceeds the threshold value set as described above. Therefore, in an attack performed by an unauthorized person, the reception time information $B_E$ used to obtain the number of coincidence events equal to the legitimate number of coincidence events to the determining unit 144 of the authentication server 10 is input. At this time, the number of elements of the reception time information $B_E$ is also indicated by Formula (1). As described above, it is difficult to exceed the threshold value in the reception time information $B_E$ roughly prepared by an unauthorized person.

For this reason, an unauthorized person is considered to know at least one of the transmission time information A held in the authentication server, the pre-shared key PSK held in the authentication server 10 and the client side device 20, and the reception time information B for the detection event generated by the client side device 20.

As described above, in the first authentication system, only the assumption that the authentication server 10 holds the transmission time information A, and the transmission time information A does not leak to the outside is sufficiently valid. Further, since the transmission time information A is based on random number information held in the random number generator 122, when the random number generated by the random number generator 122 is a natural random number, it is difficult to infer it. Further, the authentication server 10 can change the transmission time information A for each session without bringing any disadvantage or inconvenience to the authorized client. Therefore, an unauthorized person is unable to know the content of transmission time information A.

Further, even if an unauthorized person knows the transmission time information A, the unauthorized person is unable to know the reception time information B completely from the transmission time information A. This is because there is an optical loss on the quantum channel 1000 or the detection efficiency of the detecting unit 222 is less than 100%, and thus photons in the mark state are not necessarily detected by the detecting unit 222 of the client side device 20, and the number of elements of the transmission time information A is consistently larger than the number of elements of the reception time information B. In other words, an unauthorized person is unable to accurately know whether elements of the transmission time information A are actually used as elements of the reception time information B without knowing the reception time information B.

Further, the pre-shared key PSK is information which is known only to the authentication server 10 and the client side device 20. Thus, an unauthorized person is unable to know the pre-shared key PSK.

An unauthorized person may know encrypted information PSK+B flowing through the classical channel 2000 through wiretapping. However, an unauthorized person who does not know the PSK is unable to know the reception time information B from the encrypted information PSK+B.

A next attack performed by an unauthorized person is wiretapping an optical path between a management device 1 and the detecting unit 222. In other words, it is an attack of stealing the reception time information B acquired by the authorized client.

Figure 3:
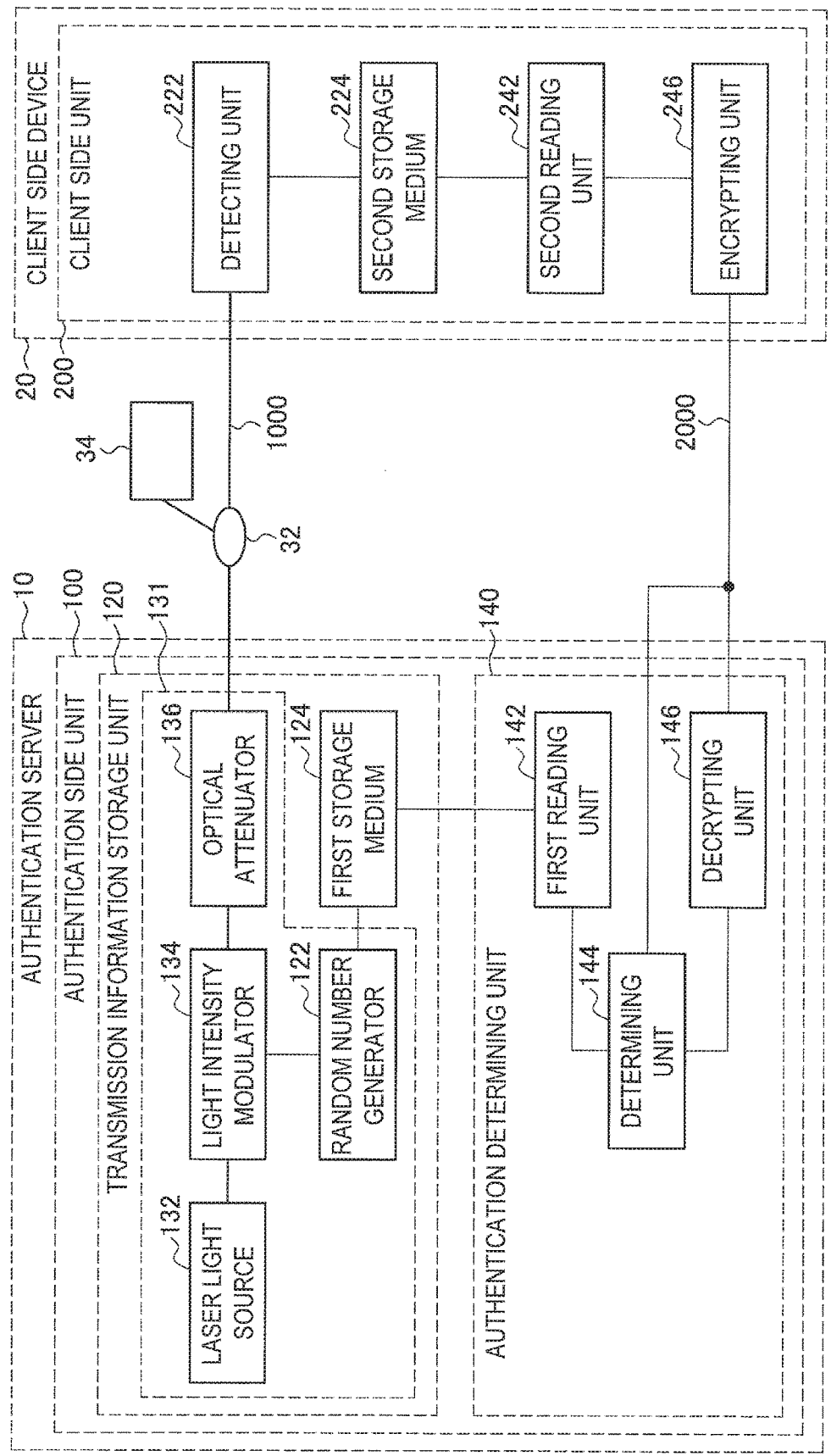
FIG. 3 is a schematic diagram for describing a wire tap attack.

As such an attack, a man-in-the-middle attack which is commonly referred to as a "wire tap attack" is known. A wire tap attack will be described with reference to FIG. 3. FIG. 3 is a schematic diagram for describing a wire tap attack. An unauthorized person is assumed to have installed an optical branching circuit 32 and an unauthorized person terminal 34.

In this case, the mean number of photons μ in the mark state when light passing through the quantum channel 1000 is output from the authentication server 10 is set to a value sufficiently smaller than 1. Therefore, the light passing through the quantum channel 1000 is light of a single photon level. Since the photons are unable to be further divided, the photons input to the optical branching circuit 32 are output from one output terminal of the optical branching circuit 32 and received by the detecting unit 222 installed in the client side device 20 or pass through the other output terminal and are received by a single photon detector of the unauthorized person terminal 34 installed by the unauthorized person.

As a result, this case is equivalent to a case in which a loss decided according to a branching ratio of the optical branching circuit 32 is imposed on both the authorized user and the unauthorized person. If there is a loss, the number of coincidence events is decreased, and thus when the threshold value k for giving the approval information is set to be high, one of the authorized user and the unauthorized person is necessarily denied.

In short, when there is a loss caused by the wire tap attack or the like, the number of elements of the reception time information B that are received is reduced. Thus, it is possible to detect an attack by the unauthorized person from a decrease in the number of elements of the reception time information B without testing the number of coincidence events.

On the other hand, the unauthorized person might prepare another light source to cover the loss and transfer the photons from the prepared light source to the authorized user. Here, an upper limit of the number of photons to be increased is a maximum of the number of elements of the reception time information B indicated by Formula (1). When the number of photons is greater than the upper limit, fraud is detected by the authorized client side device 20.

However, even when the unauthorized person generates photons which are fewer in number than the upper limit and covers the hole, the photons generated by the unauthorized person have no time correlation with the transmission time information. Thus, the number of coincidence events that is increased by the photons generated by the unauthorized person is about the expectation value of the binomial distribution indicated by Formula (3) and not increased above the threshold value.

Next, there may be an attack in which an unauthorized person receives all photons passing through the quantum channel 1000 which is referred to as an intercept/resend attack. In this case, the unauthorized person transfers the photons to the client as well since the fraud is detected by the client unless the photons are transferred to the client.

Through the intercept/resend attack, the unauthorized person is supposed to be able to completely acquire the reception time information B to be originally received by the client. However, since the unauthorized person does not know the PSK, the authentication server 10 is unable to restore the reception time information B from the encrypted information $PSK_E+B$ encrypted using an illegal $PSK_E$ prepared by the unauthorized person. As a result, the number of coincidence events exceeding the threshold value is unable to be obtained, and the unauthorized person terminal is unable to be authenticated.

Further, the unauthorized person terminal 34 has to transfer the photons to the authorized client side device 20. If a transmission loss from the authentication server 10 to the unauthorized person terminal 34 is "$\alpha_A$", and a transmission loss from the unauthorized person terminal 34 to the client side device 20 is "$\alpha_B$", a detection rate of the photons (=the number of elements of the reception time information) obtained by the unauthorized person terminal 34 is $\mu\alpha_A\eta_E n$ in accordance with Formula (1). Here, $\eta_E$ is the detection efficiency of the single photon detector with which the unauthorized person terminal 34 is equipped.

When the unauthorized person terminal 34 generates photons which are equal in number to the mean number of photons $\mu E$ in time slots in which the photons are received and transfers the photons to the authorized client side device 20, the number of elements of the reception time information obtained by the authorized client side device 20 is $\mu\alpha_A\eta_E\mu_E\alpha_B\eta n$. On the other hand, the number of elements of the correct reception time information that has to be acquired by the authorized client side device 20 is $\mu\alpha_A\alpha_B\eta n$. For this reason, the unauthorized person terminal 34 sets $\mu_E=1/\eta_E$ in order to prevent the authorized client side device 20 from noticing a change in the number of elements.

At this time, the unauthorized person terminal 34 holds $\eta_E/(\alpha_B\eta)$ times as many elements as the authorized client side device 20. In other words, the unauthorized person terminal 34 can find the elements of the reception time information obtained by the authorized client side device 20 only with the probability of $1/\eta_E/(\alpha_B\eta)$ and has to find out $\mu\alpha_A\alpha_B\eta n$ locations through $\mu\alpha_A\alpha_B\eta n$ attempts.

When the unauthorized person has equivalent technical strength to the authorized client and the detection efficiency of the single photon detector is equal ($\eta=\eta_E$), since $\eta_E/(\alpha_B\eta)>1$ is held, the expectation value of the number of elements of the reception time information B of the authorized client side device 20 that have to be found by the unauthorized person is smaller than $\mu\alpha_A\alpha_B\eta n$, and it is difficult to accurately know the reception time information B.

Further, the a mean number of photons per time slot when the photons transferred from the unauthorized person terminal are input to the detecting unit 222 of the authorized client side device 20 is $\alpha_B/\eta_E$. This value is much larger than the mean number of photons $\mu\alpha_A\alpha_B$ when there is no unauthorized person. Generally, the single photon detector constituting the detecting unit 222 can detect the input photons only with a probability of 1 or less ($\eta\leq1$). The effective detection efficiency varies depending on the input mean number of photons ($\alpha_B/\eta_E$). Generally, the effective detection efficiency $\eta_{eff}$ in a situation in which the input mean number of photons exceeds 1 is smaller than the detection efficiency $\eta$ when the input mean number of photons is 1 or less.

Thus, the increase in the mean number of photons of the light which is transferred from the unauthorized person terminal 34 to the authorized client side device 20 and input to the detecting unit 222 changes the number of elements of the reception time information B. As a result, the presence of the unauthorized person is detected by the authentic client side device 20 or the authentication server 10.

In other words, the unauthorized person is unable to receive the number of elements and the number of coincidence events which are necessary for the fraud through the intercept/resend attack described above.

As described above, the authentication server 10 can verify the validity of the client side device 20 from the number of elements of the reception time information B and the number of coincidence events between the transmission time information A and the reception time information B.

Next, there may be a detection event irrelevant to the photons transferred from the authentication server 10 such as detection of dark current noise or noise photons in the detecting unit 222.

A dark current count rate per time slot in the detecting unit 222 is assumed to be "d". Similarly, a noise photon count rate per time slot is assumed to be "$\mu n$". The dark current noise and the noise photons are assumed to be detected in each time slot of the detecting unit with equal probability.

If the number of samples (the number of time slots) is n/M (n is an integer of 1 or larger), the expectation value of the number of detection events (the number of elements of the reception time information B) in the detecting unit 222 is indicated by the following Formula (5).

$$\mu\alpha\eta n + (d + \mu_n)\frac{n}{M} \quad (5)$$

The first term in Formula (5) corresponds to events in which the intensity modulated weak light is detected. The events are detection events when all the random number generators 122 are set to the mark state. Therefore, the events are all counted as simultaneous detection events.

The second term in Formula (5) corresponds to events in which the dark current noise and the noise photons are detected. The second term has no correlation with the state of the random number generator 122. Therefore, the expectation value of the number of detections as the simultaneous detection event is a value obtained by multiplying the second term of Formula (5) by the mark ratio M.

As a result, the number of coincidence events obtained by the authorized client side device 20 is indicated by the following Formula (6).

$$\mu\alpha\eta n + (d+\mu_n)n \quad (6)$$

On the other hand, the expectation value of the number of coincidence events which can be obtained by the unauthorized person who does not know the transmission time information A is a value obtained by multiplying the number of elements of the reception time information indicated by Formula (5) by the mark ratio M and indicated by the following Formula (7).

$$\mu\alpha\eta nM+(d+\mu_n)n \quad (7)$$

Due to the presence of the dark current noise or the noise photons, the number of coincidence events is increased in both the authorized client side device 20 and the unauthorized person terminal 34. However, the difference does not change as μαηn(1−M) in Formulas (1) and (2) when there is neither dark current noise nor noise photons and Formulas (6) and (7) when there a dark current noise or noise photons.

The authentication server 10 can know n, M, μ, α, and η from its own set value, the detection efficiency of the detecting unit 222 of the client, the loss in the quantum channel 1000, or the like.

Further, the authentication server 10 can know d+μn from the number of elements of the received reception time information B.

Therefore, when the authentication server sets the threshold value to an appropriate value between Formula (6) and Formula (7) and performs the authentication process, the authentication session can be performed, similarly to when there is neither dark current noise nor noise photons.

(First Modification of the First Authentication System)

Figure 4:
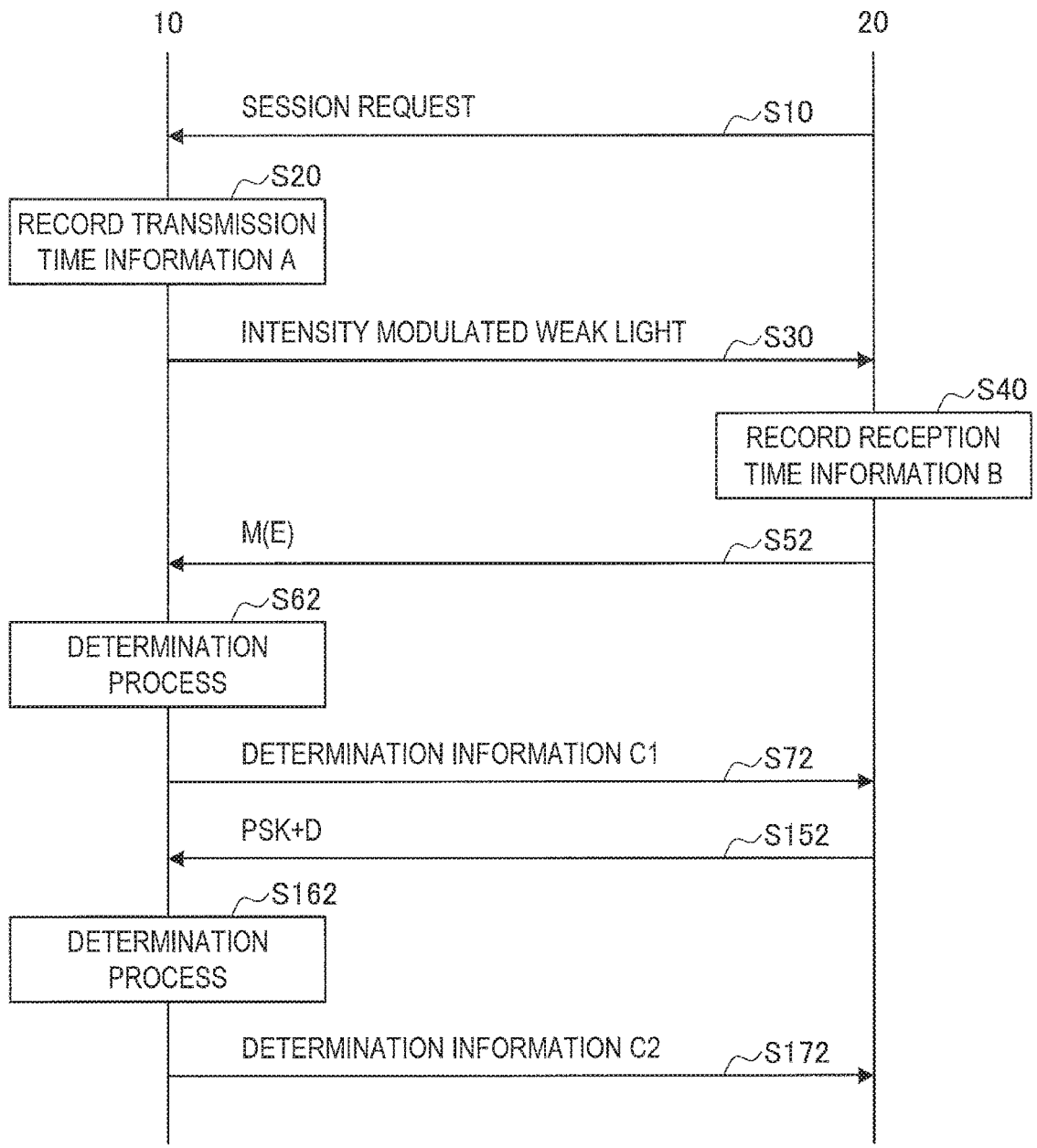
FIG. 4 is a schematic diagram illustrating an operation of a first authentication system according to a first modification.

A first modification of the first authentication system will be described with reference to FIG. 4. FIG. 4 is a schematic diagram illustrating an operation according to the first modification.

In the first modification, the encrypting unit 246 and the decrypting unit 146 are configured with an encryptor with a message authentication function and a decryptor with an authentication message receiving function, respectively.

The encryptor with the message authentication function has a function of generating an authentication message which is message-authenticated so that content of the message is unable to be altered in addition to an encryption function using a shared key. The decrypting unit with the authentication message receiving function has a function of receiving and decrypting the authentication message.

The configuration other than the encryptor with the message authentication function and the decryptor with the authentication message receiving function is similar to that of the first authentication system, and thus repeated description is omitted.

A process until the reception time information B is recorded (S40) after there is a session request (S10) is similar to that of the first authentication system.

In the first modification, the second reading unit 242 generates partial information D of a randomly selected portion (for example, half) of the reception time information B and residual information E which is remaining time information that does not overlap the partial information D.

The encrypting unit 246 serving as the encryptor with the message authentication function generates an authentication message M(E) for the residual information E. The authentication message M(E) is transmitted to the authentication server (S52).

The decrypting unit 146 serving as the decryptor with the authentication message receiving function acquires the residual information E from the authentication message M(E). The transmission time information A obtained in the first reading unit 142 and the residual information E obtained in the decrypting unit 146 are transferred to the determining unit 144. The determining unit 144 collates the transmission time information A and the residual information E, acquires the number of coincidence events and the number of elements of the residual information E, and determines whether or not the number of coincidence events and the number of elements of the residual information E are within a predetermined range (S62). This process may be performed similarly to the determination process between the transmission time information A and the reception time information B in S60.

When the number of coincidence events and the number of elements of the residual information E are within a predetermined range between the residual information E and the transmission time information A, the authentication server 10 transfers determination information C1 including the information indicating the approval to the client side device 20 to make request encryption and transmission of the partial information D (S72).

The encrypting unit 246 serving as the encryptor with the message authentication function encrypts the partial information D, generates PSK+D, and transfers PSK+D to the authentication server 10 via the classical channel 2000 (S152).

The decrypting unit 146 of the authentication side unit 100 decrypts the encrypted information PSK+D using the PSK and obtains the partial information D. Further, the first reading unit 142 of the authentication side unit 100 reads the transmission time information A from the first storage medium 124.

The transmission time information A obtained in the first reading unit 142 and the partial information D obtained in the decrypting unit 146 are transferred to the determining unit 144. The determining unit 144 collates the transmission time information A and partial information D, acquires the number of coincidence events and the number of elements of the partial information D, and determines whether or not the number of coincidence events and the number of elements of the partial information D are within a predetermined range (S162). This process may be performed similarly to the determination process between the transmission time information A and the reception time information B in S60.

The determining unit 144 determines the client side device 20 to be an authorized user when approval is given through both the first determination process (S62) and the second determination process (S162). The determining unit 144 transfers determination information C2 to the client side device 20 (S172).

In the first authentication system, the client encrypts the reception time information B and transmits PSK+B to the authentication server. At this time, when the quantum channel 1000 or the like is attacked, the number of elements of the reception time information B is decreased, or the number of coincidence events is decreased. Thus, an attacker can be detected. However, the authentication server 10 is unable to detect the attack until PSK+B is transmitted from the client side device 20. Further, in the first authentication system, PSK+B is consistently communicated regardless of an authentication result, and thus the PSK (even if only a small part) is likely to be known by the attacker at least.

On the other hand, in the first modification, there is no correlation between the reception time information D and E because they do not overlap. Therefore, the attacker is unable to know the partial information D even when the attacker can know the residual information E in the middle of the first authentication process through a technique such as normal wiretapping.

Further, the authentication server 10 can infer an attack against the partial information D by detecting the attack against the residual information E. Therefore, when the number of coincidence events and the number of elements of the residual information E do not satisfy the requirements between the partial information D and the residual information E, the authentication server 10 determines that there is a failure in the authentication process and can interrupt a subsequent authentication processes.

In this case, since the second authentication process is not performed, the unauthorized person is unable to receive PSK+D, and there is no risk of the PSK being known to the unauthorized person.

In other words, in the first modification, the authentication process is performed at least twice since the reception time information B is divided into the partial information D and the residual information E, and the server 10 and the client side device 20 can secure the PSK more securely.

(Second Modification of First Authentication System)

Next, a second modification of the first authentication system will be described.

The second modification differs from the first authentication system in that the detecting unit 222 is a variable detection efficiency detector. The variable detection efficiency detector may include a variable optical attenuator at the input terminal of the single photon detector and be configured attenuate the light input to the single photon detector, and for example, the variable detection efficiency detector may be configured to attenuate the detection efficiency of the single photon detector, for example, by reducing the drive voltage of the single photon detector.

The configuration other than the detecting unit 222 being a variable detection efficiency detector is similar to that of the first authentication system, and thus repeated description is omitted.

In the intercept/resend attack, the unauthorized person can find the reception time information of the authorized client only with a probability of $1/(\eta_E/(\alpha_B\eta))$. On the other hand, if the unauthorized person knows $\alpha_B$ and $\eta$ in advance, it is not difficult to satisfy the condition of $\eta_E/(\alpha_B\eta)=1$.

This condition means that the number of elements of the reception time information $B_E$ obtained by the unauthorized person through the intercept/resend and the number of elements of the reception time information B that has to be obtained by the authorized client coincide with each other. In other words, the unauthorized person detects the photons, and the authorized client also necessarily receives the photons in the time slots in which the photons are generated. At this time, the unauthorized person can completely control the reception time information B obtained by the authorized client, that is, can completely know the reception time information B.

In order to perform such an attack, the unauthorized person transfers a strong optical pulse in the time slot in which photons are generated by the unauthorized person so that the authorized client necessarily detects the strong optical pulse.

On the other hand, when the strong optical pulse is input to the detecting unit 222 of the authorized client side device 20 in all the time slots in which the unauthorized person terminal receives the photons, the authorized client side device 20 detects the number of elements which is $\eta_E/(\alpha_B\eta)$ times larger than in the normal state, and the fraud is here detected. In this regard, when the strong pulse is transferred, the unauthorized person has to thin out the time slots in which the unauthorized person receives them to $1/(\eta_E/(\alpha_B\eta))$, input the strong optical pulse only in the time slot, and transfer the strong pulse to the authorized client.

When the unauthorized person terminal does not know the loss $\alpha_B$ until the photons transferred by the unauthorized person terminal arrive at the single photon detector of the client side device 20 and the detection efficiency $\eta$ of the single photon detector of the client side device 20, the unauthorized person does not know the degree to which the optical pulses are thinned out.

Further, as described above, generally, the single photon detector can generally detect the photons only with a probability of 1 or less ($\eta \leq 1$), and thus the effective detection efficiency $\eta_{eff}$ changes in accordance with the input mean number of photons. Therefore, if the unauthorized person does not change the intensity of the optical pulse to be appropriately transmitted according to $\alpha_B$ and $\eta$, the number of elements of the reception time information B of the authorized client side device 20 is increased or decreased, and the fraud is detected.

In this case, the authorized client side device 20 can detect the presence of the unauthorized person by changing $\eta$ and $\alpha_B$ through a method of changing the detection efficiency of the single photon detector included in the authorized client side device 20 or inserting an optical attenuator into an optical input terminal of the detecting unit 222 and changing the attenuation rate.

Here, an example in which a variable optical attenuator is installed at the input terminal of the single photon detector to attenuate the light input to the single photon detector will be described.

The authorized client side device 20 sets a loss to $\alpha_{B1}$ for a ratio q (q is a real number of 0 or larger and 1 or less) and sets a loss to $\alpha_{B2}$ for a ratio (1-q) in all assumed time slots, and receives incoming photons.

At this time, a ratio of ones received with the loss of $\alpha_{B1}$ and ones received with the loss of $\alpha_{B2}$ in the number of elements included in the reception time information B is $q\alpha_{B1}:(1-q)\alpha_{B2}$ since the mean number of photons $\mu\alpha_A\alpha_B$ per time slot is sufficiently smaller than 1 in the normal case.

On the other hand, when there is an attack of the strong pulse, since the detection efficiency depends on the loss or the like, the ratio is $qf(\mu_E, \alpha_{B1}, \eta):(1-q)f(\mu_E, \alpha_{B2}, \eta)$. Here, f(x, y, z) refers to a detection probability when photons of a mean number of photons x suffer a loss y and are then detected by a single photon detector with a detection efficiency z at a low photon number. The mean number of photons input to the photon detector is xy.

Of course, when xy<<1, x(x, y, z)=xyz which matches the detection probability when no attack is received.

When both the photons with the loss $\alpha_{B1}$ and the photons with the loss $\alpha_{B2}$ are received after the attack using the strong pulse, that is, when $f(\mu_E, \alpha_{B1}, \eta)=f(\mu_E, \alpha_{B2}, \eta)=1$, a reception ratio is q:1−q which is different from that in the normal case.

On the other hand, when both photons are received with only a small loss, for example, when $f(\mu_E, \alpha_{B1}, \eta)=1$ and $f(\mu_E, \alpha_{B2}, \eta)<1$, the reception ratio is $q(1-q)f(\mu_E, \alpha_{B2}, \eta)$. However, since $f(\mu_E, \alpha_{B2}, \eta)=\alpha_{B2}/\alpha_{B1}$ is not true, the reception ratio is different from that in the normal case.

The client side device 20 can freely set q, $\alpha_{B1}$, and $\alpha_{B2}$. Therefore, the client can detect the attack using the strong optical pulse performed by the attacker by comparing the reception ratio of the signal detected by the client with the reception ratio set by the client.

In this case, since the client side device 20 can detect the unauthorized person without transferring the reception time information B to the authentication server 10, the unauthorized person is unable to perform any attack on the PSK.

Further, when the client side device 20 determines that there is no unauthorized person in the process of verifying the reception ratio, the client side device 20 transmits detection probability setting information when the reception time information B is received together with the reception time information B, and thus the authentication server 10 can easily calculate the number of elements of the legitimate reception time information including loss information and the number of coincidence events. Therefore, the identification authentication can be performed, similarly to the first authentication system.

Here, the detection probability setting information is information indicating whether the loss is set to $\alpha_{B1}$ or $\alpha_{B2}$ in each received slot.

Similarly, the client side device 20 can modify the detection probability η of its own single photon detector. In this case, the detection probability η set in the single photon detector is the detection probability setting information.

According to the second modification, the client side device 20 can detect the intercept/resend attacks using the strong optical pulse of the unauthorized person terminal, and thus more secure authentication can be performed.

The second modification can also be applied to the first modification.

(Third Modification of First Authentication System)

Figure 5:
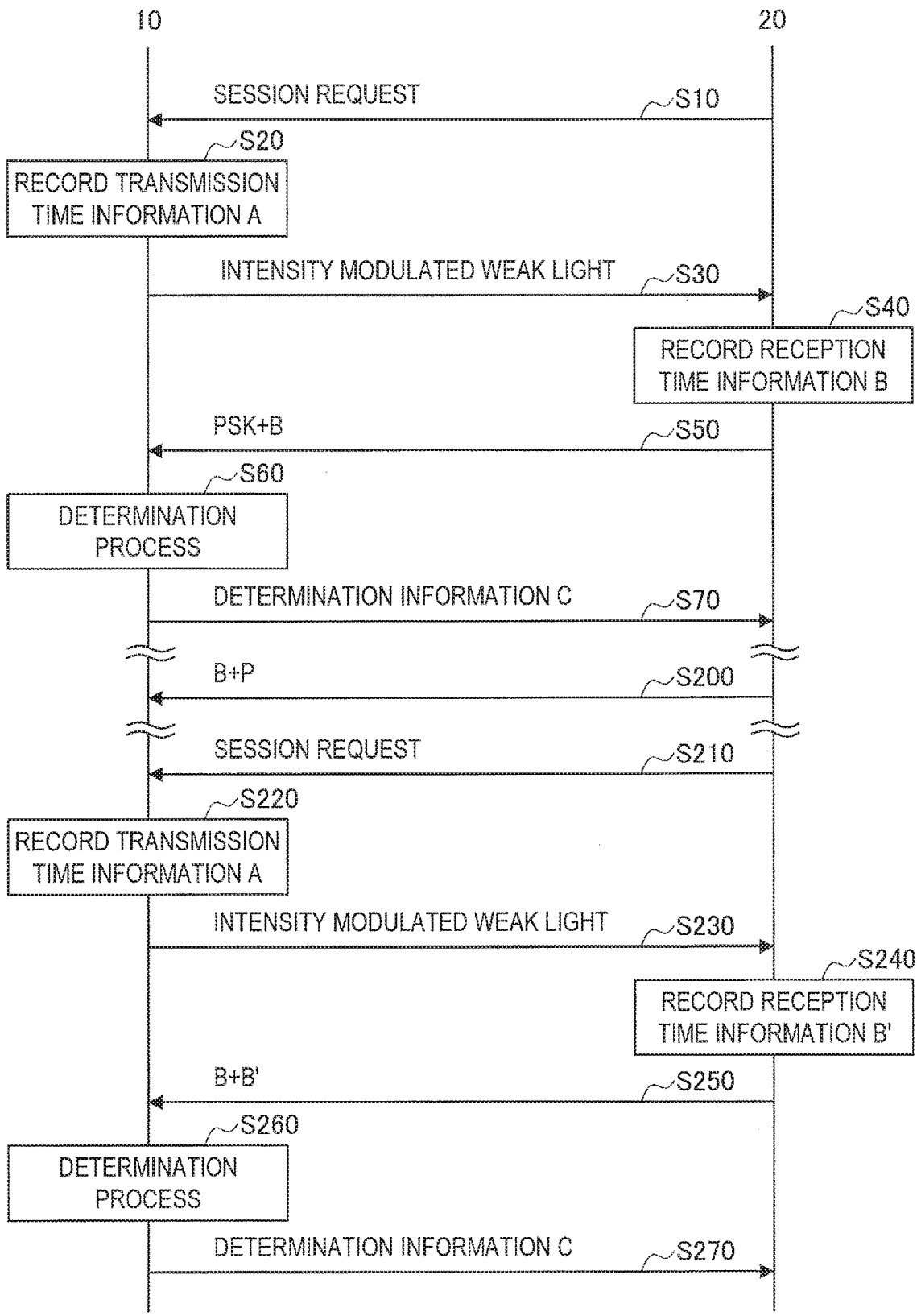
FIG. 5 is a schematic diagram illustrating an operation of a first authentication system according to a second modification.

A third modification of the first authentication system will be described with reference to FIG. 5. FIG. 5 is a schematic diagram illustrating an operation according to the third modification.

The process is similar to that of the first authentication system until the determining unit 144 transfers the determination information C to the client side device 20 (S70) after there is a session request (S10).

In the third modification, after the authentication session is completed, the client side device 20 encrypts plain text P which is desired to be transmitted using the reception time information B as a common key, generates an encrypted signal B+P, and transfers the encrypted signal B+P to the authentication server 10 via a classical channel 2000 (S200). In the authentication server 10, the decrypting unit decrypts the encrypted signal B+P using the reception time information B and obtains the plain text.

Accordingly, it is possible to perform more secure common-key type cryptographic communication from the client to the authentication server.

Further, it is possible to use the reception time information B as the pre-shared key. In this case, the authentication server 10 and the client side device 20 hold the reception time information B as the pre-shared key.

When there is a next session request (S210), the client side device 20 encrypts the newly acquired reception time information B' using the reception time information B held as the pre-shared key, generates an encrypted signal B+B', and transmits the encrypted signal B+B' to the authentication server 10. The authentication server 10 decrypts the encrypted signal B+B' using the reception time information B held as the pre-shared key, and acquires new reception time information B'. Here, steps S210 to S270 are the same as steps S10 to S70 except that the reception time information B acquired through the previous session request in S250 is used as the PSK.

As described above, in this third modification, it is possible to update the pre-shared key for each session, and thus it is possible to secure higher security.

However, the third modification can be applied to the first modification or the second modification.

(Second Authentication System)

Figure 6:
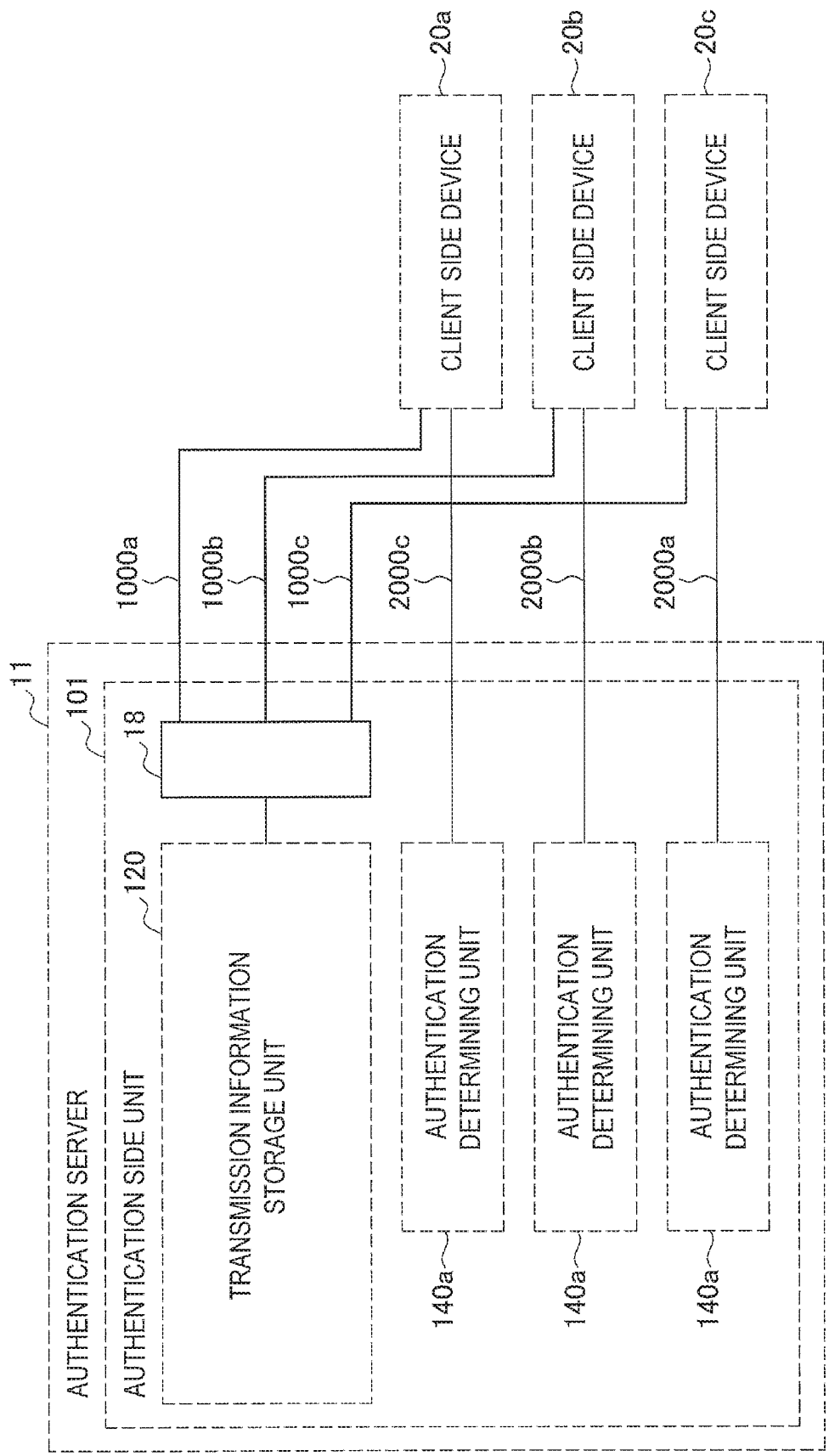
FIG. 6 is a schematic diagram of a second authentication system.

An authentication system according to a second embodiment (hereinafter referred to as a "second authentication system") will be described with reference to FIG. 6. FIG. 6 is a schematic diagram of the second authentication system.

The second authentication system differs from the first authentication system in that m client side devices 20 are installed (m is an integer of 2 or larger). For this reason, the authentication side device is an authentication server 11 that can accommodate m client side devices and includes an authentication side unit 101 that can perform a session with m client side devices.

A configuration of each of the client side devices 20 is similar to that of the first authentication system, and thus description thereof is omitted.

In the second authentication system, the authentication server 11 includes an optical distributing unit 18 including one input and m outputs. The optical distributing unit 18 receives the intensity modulated weak light from the intensity modulated weak light source 131, spatially branches it into m, and outputs it. The photons output from one of the output terminals of the optical distributing unit 18 are transferred to the client side devices 20 in a one-to-one correspondence relation with the output terminals. Here, since the photons are unable to be split, the photons input to the optical distributing unit 18 are output to only one of the first to m-th output terminals.

As an optical distributing unit 18, for example, a 1×m type optical switch can be used. In other words, the path is switched by the optical switch so that photons are output only to the client side device 20 that has transmitted the authentication request.

On the other hand, in this method, it is difficult to deal with the case in which there are authentication requests from a plurality of client side devices 20. One of methods of dealing with this is a method of using a 1×m type optical coupler as the optical distributing unit 18. In this case, the photons are distributed to the respective client side devices 20 with equal probabilities. For this reason, the number of coincidence events is decreased to 1/m in principle, but it is easy to design a threshold value for approval and denial and a logarithm of a mean number of photons in view of this. Here, an example of m=3 is described.

Three output terminals of the optical distributing unit 18 are connected to quantum channels 1000a to 1000c, and the intensity modulated weak light passing through the respective optical paths is transmitted to client side devices 20a to 20c.

The optical intensity is adjusted through the optical attenuator 136 of the transmission information storage unit 120 so that the mean number of photons in the mark state in each of the m output terminals of the optical distributing unit 18 is sufficiently smaller than 1. Here, the mean number of photons in the mark state in each of the m output terminals is assumed to be $\mu$ (<1). Even when the value varies depending on the output terminal, the effects of the present embodiment do not change.

From a point of view of each client side device 20, the received light is the intensity modulated weak light having the mark ratio M and the mean number of photons $\mu$ in the mark state, similarly to the first authentication system. Therefore, each client side device 20 can be configured in a similar manner to that of the first authentication system.

Next, a correlation of reception time information Ba to Bc shared between the client and the authentication server will be described.

As is well known, a quantum mechanical state of laser light is indicated by a coherent state. It is also well known that an output state after splitting the coherent state through a beam splitter is a direct product of the coherent states of the respective output terminals.

The optical distributing unit 18 with the m branches is equivalent to a circuit in which a plurality of beam splitters are combined. Therefore, the output state of the optical distributing unit 18 is a direct product state of the coherent states of the m output terminals. The direct product state indicates that there is no correlation between the individual quantum states. This means that there is no correlation between measurement results of a plurality of output terminals of the optical distributing unit 18.

In other words, even when the transmission time information A in the light intensity modulator 134 is the same, the reception time information Ba to Bc received by the client side devices 20a to 20c is different, and has no correlation.

Thus, since pre-shared keys PSKa to PSKc shared by the client side devices 20a to 20c and the authentication server 11 are different from one another, when the pre-shared keys PSKa to PSKc are not known to other client side devices 20, each client side device 20 is unable to know the reception time information B shared between the other client side devices 20 and the authentication server 11.

As a result, the authentication server 11 can individually authenticate the individual client side devices 20a to 20c. Further, no client side device 20 is able to impersonate another client side device 20.

Even when there is a variation in the mean number of photons in the mark state of each of the m output terminals, the fact that the output state of the optical distributing unit 18 is the direct product state of the coherent states of the m output terminals does not change. For this reason, if the branching ratio is known in advance, the threshold value has only to be set in view of the branching ratio, and thus there is no influence on the effect of the present embodiment.

The first to third modifications of the first authentication system can also be applied to the second authentication system.

(Third Authentication System)

Figure 7:
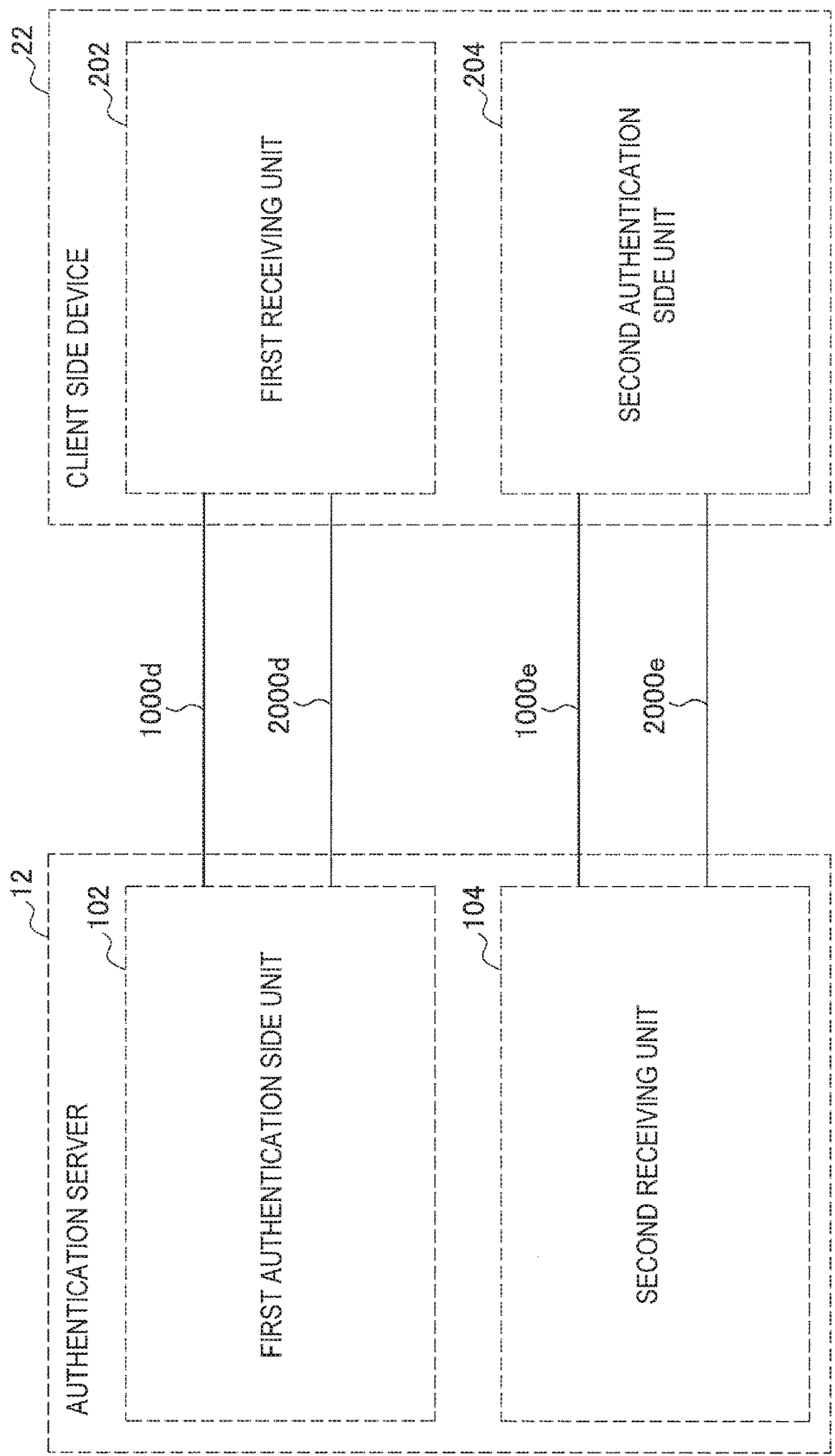
FIG. 7 is a schematic diagram of a third authentication system.

An authentication system according to a third embodiment (hereinafter referred to as a "third authentication system") will be described with reference to FIG. 7. FIG. 7 is a schematic diagram of the third authentication system.

In the third authentication system, the authentication server 12 includes a first authentication side unit 102 and a second receiving unit 104, and a client side device 22 includes a first receiving unit 202 and a second authentication side unit 204. Each of the first authentication side unit 102 and the second authentication side unit 204 has a similar configuration to that of the authentication side unit of the first authentication system. Further, each of the first receiving unit 202 and the second receiving unit 104 has a similar configuration to that of the client side unit of the first authentication system. Therefore, repeated description is omitted.

In the third authentication system, the first authentication system is constituted by the first authentication side unit 102 and the first receiving unit 202, and the first authentication system is constituted by the second authentication side unit 204 and the second receiving unit 104.

Accordingly, the authentication server 12 and the client side device 22 can authenticate the other party as an authorized user.

In FIG. 7, quantum channels 1000d and 1000e are illustrated as optical transmission paths which are separately installed, but a single optical transmission path may be used for both directions.

Similarly, classical channels 2000d and 2000e are illustrated as transmission paths which are separately installed, but a single transmission path may be used for both directions.

Further, the first to third modifications of the first authentication system can be applied to the third authentication system. Further, when the second authentication system is applied to the third authentication system, it is possible to authenticate the other party as an authorized user in an arbitrary combination of three or more terminals or servers.

(Security System)

Figure 8:
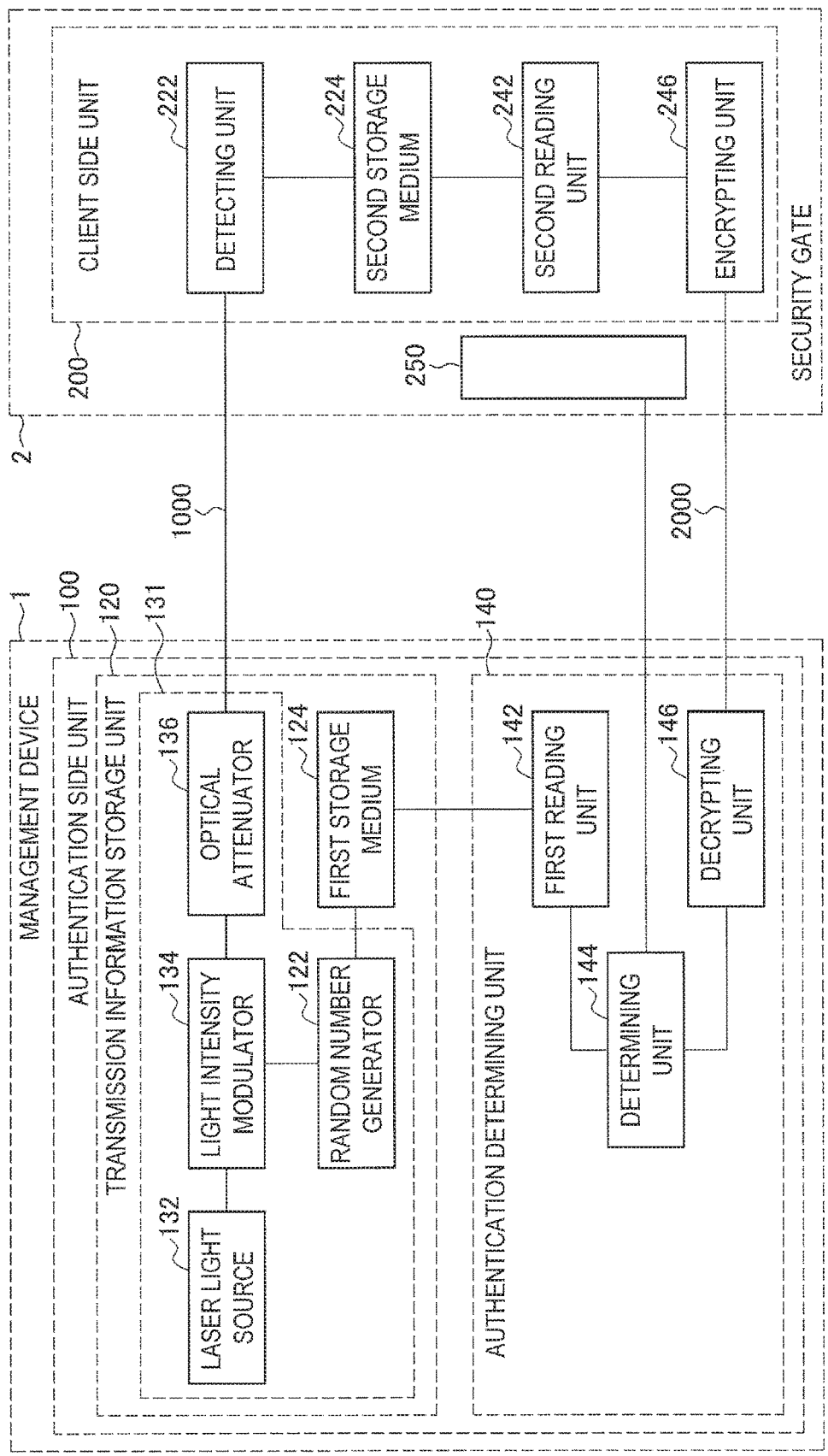
FIG. 8 is a schematic diagram of a security system.

An example of a security system according to an embodiment of the present invention will be described with reference to FIG. 8. FIG. 8 is a schematic diagram of the security system.

The security system is an entrance/exit management system using the first authentication system.

The security system includes a management device 1 and a security gate 2. The security gate 2 has a physical entrance/exit gate 250 through which users actually pass. When a user is determined to be an authorized user at the time of exit, the entrance/exit gate 250 is opened, and when the user is determined to be an unauthorized person, the entrance/exit gate 250 is not opened, and the unauthorized person is unable to pass through the entrance/exit gate 250. The management device 1 determines whether or not the user is an authorized user or an unauthorized person.

Here, the entrance/exit gate 250 has been described using an example of a physical gate, but the present invention can also be applied to an electronically installed virtual gate such as a firewall.

The management device 1 has a similar configuration to the authentication server of the first authentication system. The security gate 2 includes the client side unit 200 of the first authentication system in addition to the entrance/exit gate 250. Therefore, description overlapping that of the first authentication system may be omitted.

The determining unit 144 creates authentication information M(C) including the determination information C. The authentication information M(C) is transferred to the entrance/exit gate 250.

The entrance/exit gate 250 is opened when the transmitted determination information C includes the information indicating the approval. On the other hand, when the determination information C includes the information indicating the denial, the entrance/exit gate 250 is not opened. In this case, a notification indicating that the user who desires to pass through the entrance/exit gate 250 is an unauthorized person is given to the management device 1. The management device 1 gives a notification to an administrator, a security officer, and someone else using any appropriate means.

(First Entrance/Exit Management Method)

A user who uses the security gate 2 holds a second storage medium 224 such as an ID card. When the user enters through the entrance/exit gate 250, the detecting unit 222 and the second storage medium 224 are communicably connected. Accordingly, the reception time information B in the detecting unit 222 is recorded in the second storage medium 224. A connection between the detecting unit 222 and the second storage medium 224 can be established by an arbitrary appropriate means. A non-contact IC card system using a radio frequency identifier (RFID) may be used as the second storage medium 224. In this case, the detecting unit 222 may be equipped with an RF signal transmission/reception system. Alternatively, an arbitrary appropriate card reader/writer may be provided to record information on the second storage medium 224 and to read information recorded on the second storage medium 224. In this case, the transmission time information A is recorded in the first storage medium 124.

In order to cause the transmission time information A and the reception time information B to be based on the random numbers generated in the same period of time, a notification indicating that the detecting unit 222 and the second storage medium 224 are connected may be given to the management device 1, and thus the random number generator 122 may be configured to generate a random number for a certain period of time. Alternatively, the random number generator 122 may periodically generate a random number and record the reception time information B in a RAM or the like of the detecting unit 222, and when the detecting unit 222 and the second storage medium 224 are connected, the reception time information B may be written in the second storage medium 224 from the RAM.

When the user exits through the entrance/exit gate 250, the second reading unit 242 and the second storage medium 224 are communicably connected. Accordingly, the second reading unit 242 reads the reception time information B recorded in the second storage medium 224. The connection between the second reading unit 242 and the second storage medium 224 can be established by any suitable means, similarly to the connection between the detecting unit 222 and the second storage medium 224.

The second reading unit 242 transmits authentication information M(B) including the reception time information B to the management device 1. When the authentication information M(B) is received, the determining unit 144 of the management device 1 gives an instruction to the first reading unit 142 in response to the reception of the authentication information M(B), and the first reading unit 142 receives the transmission time information A from the first storage medium 124. The determining unit 144 collates the transmission time information A and the reception time information B, and acquires the number of coincidence events.

When the number of coincidence events is within a predetermined range which is set in advance, the determining unit 144 determines the user to be an authorized user and creates the determination information C including the information indicating the approval. On the other hand, when the number of coincidence events does not satisfy the threshold value, the determining unit 144 determines the user to be an unauthorized person and creates the determination information C including the information indicating the denial.

Then, the determining unit 144 creates the authentication information M(C) including the determination information C.

The authentication information M(C) is transferred to the entrance/exit gate 250. The entrance/exit gate 250 is opened when the received authentication information M(C) includes the information indicating the approval.

On the other hand, when the authentication information M(C) includes the information indicating the denial, the entrance/exit gate 250 is not opened. Further, a notification indicating that the user who desires to pass through the entrance/exit gate 250 is an unauthorized person is sent to the administrator, the user, the security officer, or someone else.

In the security system and the first entrance/exit management method, the transmission time information A and the reception time information B are updated each time the user enters through the entrance/exit gate 250. For this reason, the reception time information B which is previously held is unable to be used to exit through the entrance/exit gate 250 later. Thus, according to the security system and the first entrance/exit management method, only the exit of authorized users is allowed, and it is possible to detect the presence of unauthorized users.

In the above situation, the following attack may be performed as an attack of enabling an unauthorized person to exit through the entrance/exit gate 250.

First, there is a method of stealing the second storage medium 224 managed by the user, copying content of the second storage medium 224, and forging it.

In this method, the unauthorized person is able to exit through the entrance/exit gate 250 as an authorized user before the authorized user attempts to exit through the entrance/exit gate 250.

In this case, for example, it is desirable that the first storage medium 124 included in the management device 1 and the second storage medium 224 held by the authorized user record the previous (for example, last) transmission time information A and the reception time information B, respectively, and perform double checking by collating them. In the above configuration, since the transmission time information A and the reception time information B which are used by the unauthorized person but not known to the authorized user are included, at least the authorized user and the gate manager can detect that an unauthorized exit has been performed in the past. In this regard, it is possible to prevent a subsequent attack, for example, by invalidating the ID card.

A next attack performed by an unauthorized person is wiretapping for a communication path or an optical path which is accessible to the unauthorized person.

In wiretapping for the communication path between the second reading unit 242 and the management device 1, an authorized user can obtain the authentication information M(B) used when exiting through the gate. Accordingly, the wiretapper can know the reception time information B in which the valid number of coincidence events is obtained. However, even when the authorized user can know the reception time information B when exiting through the gate, it is rarely beneficial to the unauthorized person. This is because, for example, when double-checking is performed using the previous (for example, last) transmission time information A and the reception time information B, it is detected that there have been two exit requests using the same the reception time information B.

In next wiretapping for the communication path between the management device 1 and the entrance/exit gate 250, it is possible to obtain the authentication information M(C) used for passing through the gate. Thus, the wiretapper can obtain the determination information C used for opening the gate. The unauthorized person who can open the entrance/exit gate using the determination information C has authority to open substantially all gates. For the unauthorized person having such strong authority, wiretapping is meaningless, and it is meaningless to consider such an attack.

A next attack performed by an unauthorized person is wiretapping for an optical path between the management device 1 and the detecting unit 222. In other words, it is an attack of stealing the reception time information B received when an authorized user enters through the gate.

As such an attack, the man-in-the-middle attack which is commonly referred to as a "wire tap attack" is known. As described above, an unauthorized person is unable to obtain the reception time information $B_E$ of the number of coincidence events enabling the unauthorized person to pass through the gate.

As described above, the first authentication system can be applied to the security system. The second and third authentication systems and the first to third modifications can also be applied to the security system.

(Second Entrance/Exit Management Method)

In the first entrance/exit management method, the exit of authorized users is allowed, and the exit of unauthorized users is detected and prevented. On the other hand, in the second entrance/exit management method, the entrance/exit of authorized users is allowed, and the entrance/exit of unauthorized users is detected and prevented. The second entrance/exit management method can be implemented using the security system described above.

A gate manager and a user using the security gate 2 are assumed to have the first and second storage mediums 124 and 224 in which transmission time information A0 and reception time information B0 which are "legitimate" are held in advance, respectively. In such a mechanism, the process of obtaining the time information which has been described as the process of the first entrance/exit management method may be executed at the time at which, for example, an ID card is issued.

When the user holding the legitimate reception time information B0 enters through the entrance/exit gate 250, the second reading unit 242 and the ID card which is the second storage medium 224 are communicably connected. Accordingly, the second reading unit 242 reads the reception time information B0 recorded in the second storage medium 224. The second reading unit 242 generates authentication information M(B0) including the reception time information B0.

The authentication information M(B0) is transmitted to the determining unit 144 in the management device 1. Upon receiving the authentication information M(B0), the determining unit 144 instructs the first reading unit 142 to receive the transmission time information A0 that the first reading unit 142 has read from the first storage medium 124. The determining unit 144 collates the transmission time information A0 and the reception time information B0, and acquires the number of coincidence events.

When the number of coincidence events exceeds a predetermined threshold value, the determining unit 144 determines the user to be an authorized user and creates the determination information C including the information indicating the approval. On the other hand, when the number of coincidence events does not satisfy a certain value, the determining unit 144 determines the user to be an unauthorized person and creates the determination information C including the information indicating the denial.

Then, the determining unit 144 creates the authentication information M(C) including the determination information C.

The authentication information M(C) is transferred to the entrance/exit gate 250. The entrance/exit gate 250 is opened when the transmitted determination information C includes the information indicating the approval. On the other hand, when the determination information C includes the information indicating the denial, the entrance/exit gate 250 is not opened. Further, a notification indicating that the user who desires to pass through the entrance/exit gate 250 is an unauthorized person is sent to the administrator, the user, the security officer, or someone else.

In the second entrance/exit management method, when the determination information C includes the approval information, the management device 1 generates a next random number when the authentication information M(C) is transferred. Transmission time information A1 and reception time information B1 based on the random number are newly recorded in the first and second storage mediums 124 and 224.

Then, it is possible to perform the authentication when the user exits through the gate next time by performing a similar process to the process at the time of entrance using the transmission time information A1 and the reception time information B1 which are newly recorded. Further, new transmission time information A2 and reception time information B2 which are received by generating, receiving, and detecting the intensity modulated weak light again at the time of exit can be used when the user re-enters through the gate next time.

In the second entrance/exit management method, the transmission time information A and the reception time information B are updated each time the user enters or exits through the entrance/exit gate 250. For this reason, the reception time information B which is previously held is unable to be used when the user enters or exits through the entrance/exit gate 250 later. Thus, according to the second entrance/exit management method, only the entrance/exit of authorized users is allowed, and the entrance/exit of unauthorized users can be detected.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

What is claimed is:

1. An authentication system, comprising:
an authentication side unit including an intensity modulated weak light source, a first storage medium, a first reading unit, a decrypting unit, and a determining unit; and
a client side unit including a detecting unit, a second storage medium, a second reading unit, and an encrypting unit,
wherein the intensity modulated weak light source generates intensity modulated weak light in which a mean number of photons of a mark state is 1 or less, and a temporal position of the mark state is randomly modulated,
the first storage medium records a time at which the intensity modulated weak light source is set to the mark state as transmission time information,
the first reading unit reads the transmission time information from the first storage medium,
the detecting unit detects the intensity modulated weak light via a quantum channel, and records the detected time in the second storage medium as reception time information,
the second reading unit reads the reception time information from the second storage medium,
the encrypting unit encrypts all or part of the reception time information using a pre-shared key and generates encrypted information,
the decrypting unit decrypts the encrypted information using the pre-shared key, and acquires all or part of the reception time information, and
the determining unit acquires a number of coincidence events using the transmission time information read from the first reading unit and the all or part of the reception time information read from the decrypting unit, acquires a number of elements of the all or part of the reception time information, generates determination information including information indicating approval when both of the number of coincidence events and the number of elements are within a range of a set value which is set in advance, and generates determination information including information indicating a denial in the other cases.

2. The authentication system according to claim 1,
wherein two or more units are installed as the client side unit, and
the authentication side unit further includes an optical branching circuit configured to branch the intensity modulated weak light and transfer the branched intensity modulated weak light to each of the client side units.

3. The authentication system according to claim 1,
wherein the encrypting unit has a function of encrypting partial information which is part of the reception time information using the pre-shared key and adding a message authentication function for alteration prevention to residual information which is part of the reception time information and does not overlap the partial information, and
the decrypting unit has a function of decrypting the partial information using the pre-shared key and acquiring the residual information to which the message authentication function is added.

4. The authentication system according to claim 1,
wherein the detecting unit is a single photon detector having variable detection efficiency, and
the reception time information includes information of the detection efficiency.

5. The authentication system according to claim 1,
wherein the detecting unit is a single photon detector having a variable input light intensity attenuation rate, and
the reception time information includes information of the attenuation rate.

6. The authentication system according to claim 1,
wherein the intensity modulated weak light source includes
a light source configured to generate continuous light,
a random number generator configured to randomly generate a bit "0" and a bit "1," sequentially allocate the generated bits to time slots and generate a random number, and record a time corresponding to the bit "1" in the first storage medium as the transmission time information,
a light intensity modulator configured to modulate the intensity of output light from the light source on the basis of the random number and generate intensity modulated light by setting the mark state in which photons are included in a time slot in which the random number is the bit "1" and setting a space state in which photons are not included in a time slot in which the random number is the bit "0," and
an optical attenuator configured to attenuate the mean number of photons of the mark state to be 1 or less.

7. The authentication system according to claim 1,
wherein the intensity modulated weak light source includes
a random number generator configured to randomly generate a bit "0" and a bit "1," sequentially allocate the generated bits to time slots and generate a random number, and record a time corresponding to the bit "1" in the first storage medium as the transmission time information,
a light intensity modulated light source configured to generate intensity modulated light by setting a space state in which photons are not included in a time slot in which the random number is the bit "0," and
an optical attenuator configured to attenuate the mean number of photons of the mark state to be 1 or less.

8. The authentication system according to claim 1, further comprising:
a first terminal including a first authentication side unit and a first client side unit; and
a second terminal including a second authentication side unit and a second client side unit,
wherein the first authentication side unit and the second client side unit are the authentication side unit and the client side unit that share a pre-shared key, respectively, and
the second authentication side unit and the first client side unit are the authentication side unit and the client side unit that share a pre-shared key, respectively.

9. An authentication side device, comprising:
an intensity modulated weak light source;
a first storage medium;
a first reading unit;
a decrypting unit; and
a determining unit, wherein the intensity modulated weak light source generates intensity modulated weak light in which a mean number of photons of a mark state is 1 or less, and a temporal position of the mark state is randomly modulated and transmits the intensity modulated weak light to a client side device, the first storage medium records a time at which the intensity modulated weak light source is set to the mark state as transmission time information, the first reading unit reads the transmission time information from the first storage medium, the decrypting unit decrypts encrypted information using a pre-shared key, and acquires all or part of reception time information which is information of a time at which a detection event occurred in the client side device, the determining unit acquires a number of coincidence events using the transmission time information read from the first reading unit and the all or part of the reception time information read from the decrypting unit, acquires a number of elements of the all or part of the reception time information, generates determination information including information indicating an approval when both of the number of coincidence events and the number of elements are within a range of a set value which is set in advance, and generates determination information including information indicating a denial in the other cases.

10. The authentication side device according to claim 9, further comprising:

an optical branching circuit configured to branch the intensity modulated weak light and transfer the branched intensity modulated weak light to each of a plurality of the client side devices.

11. The authentication side device according to claim 9, wherein the decrypting unit has a function of decrypting the partial information which is part of the reception time information using the pre-shared key and acquiring a residual information to which a message authentication function is added, the residual information being part of the reception time information and not overlapping the partial information.

12. The authentication side device according to claim 9, wherein the intensity modulated weak light source includes a light source configured to generate continuous light, a random number generator configured to randomly generate a bit "0" and a bit "1," sequentially allocate the generated bits to time slots and generates a random number, and record a time corresponding to the bit "1" in the first storage medium as the transmission time information, a light intensity modulator configured to modulate the intensity of output light from the light source on the basis of the random number and generate intensity modulated light by setting the mark state in which photons are included in a time slot in which the random number is the bit "1" and setting a space state in which photons are not included in a time slot in which the random number is the bit "0," and an optical attenuator configured to attenuate the mean number of photons of the mark state to be 1 or less.

13. The authentication side device according to claim 9, wherein the intensity modulated weak light source includes a random number generator configured to randomly generate a bit "0" and a bit "1," sequentially allocate the generated bits to time slots and generate a random number, and record a time corresponding to the bit "1" in the first storage medium as the transmission time information, a light intensity modulated light source configured to generate intensity modulated light by setting the mark state in which photons are included in a time slot in which the random number is the bit "1" and setting a space state in which photons are not included in a time slot in which the random number is the bit "0," and an optical attenuator configured to attenuate the mean number of photons of the mark state to be 1 or less.

14. A security system comprising:

a management device that includes an authentication side unit, the authentication side unit including an intensity modulated weak light source, a first storage medium, a first reading unit, a decrypting unit, and a determining unit; and a security gate that includes an entrance/exit gate and a client side unit, the client side unit including a detecting unit, a second storage medium, a second reading unit, and an encrypting unit, wherein the intensity modulated weak light source generates intensity modulated weak light in which a mean number of photons of a mark state is 1 or less, and a temporal position of the mark state is randomly modulated, the first storage medium records a time at which the intensity modulated weak light source is set to the mark state as transmission time information, the first reading unit reads the transmission time information from the first storage medium, the detecting unit detects the intensity modulated weak light via a quantum channel, and records the detected time in the second storage medium as reception time information, the second reading unit reads the reception time information from the second storage medium, the encrypting unit encrypts all or part of the reception time information using a pre-shared key and generates encrypted information, the decrypting unit decrypts the encrypted information using the pre-shared key, and acquires all or part of the reception time information, and the determining unit acquires a number of coincidence events using the transmission time information read from the first reading unit and the all or part of the reception time information read from the decrypting unit, acquires a number of elements of the all or part of the reception time information, generates determination information including information indicating approval when both of the number of coincidence events and the number of elements are within a range of a set value which is set in advance, and generates determination information including information indicating a denial in the other cases, and the entrance/exit gate is opened when the determination information includes information indicating approval.

* * * * *